No. 645,242. Patented Mar. 13, 1900.
H. WHITLOCK.
CREAM SEPARATOR.
(Application filed Oct. 6, 1899.)
(No Model.)

Witnesses
F. E. Alden

Henry Whitlock, Inventor.
By his Attorneys,

UNITED STATES PATENT OFFICE.

HENRY WHITLOCK, OF FARMINGTON, IOWA.

CREAM-SEPARATOR.

SPECIFICATION forming part of Letters Patent No. 645,242, dated March 13, 1900.

Application filed October 6, 1899. Serial No. 732,800. (No model.)

*To all whom it may concern:*

Be it known that I, HENRY WHITLOCK, a citizen of the United States, residing at Farmington, in the county of Van Buren and State of Iowa, have invented a new and useful Cream-Separator, of which the following is a specification.

This invention relates to cream-separators; and it has for its object to provide an improved can or receptacle for containing the milk, so that a cooling agent may be applied to the latter for the purpose of diminishing the temperature thereof and whereby the cream is caused to separate from the milk, and, furthermore, to conveniently draw off the milk from the cream. It is also designed to provide means for applying the cooling agent to the lower portion of the milk, so as to prevent currents therein and other disturbances of the milk which would retard the process of separation, and finally to maintain a sanitary device.

To these ends the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

Figures 1, 2:
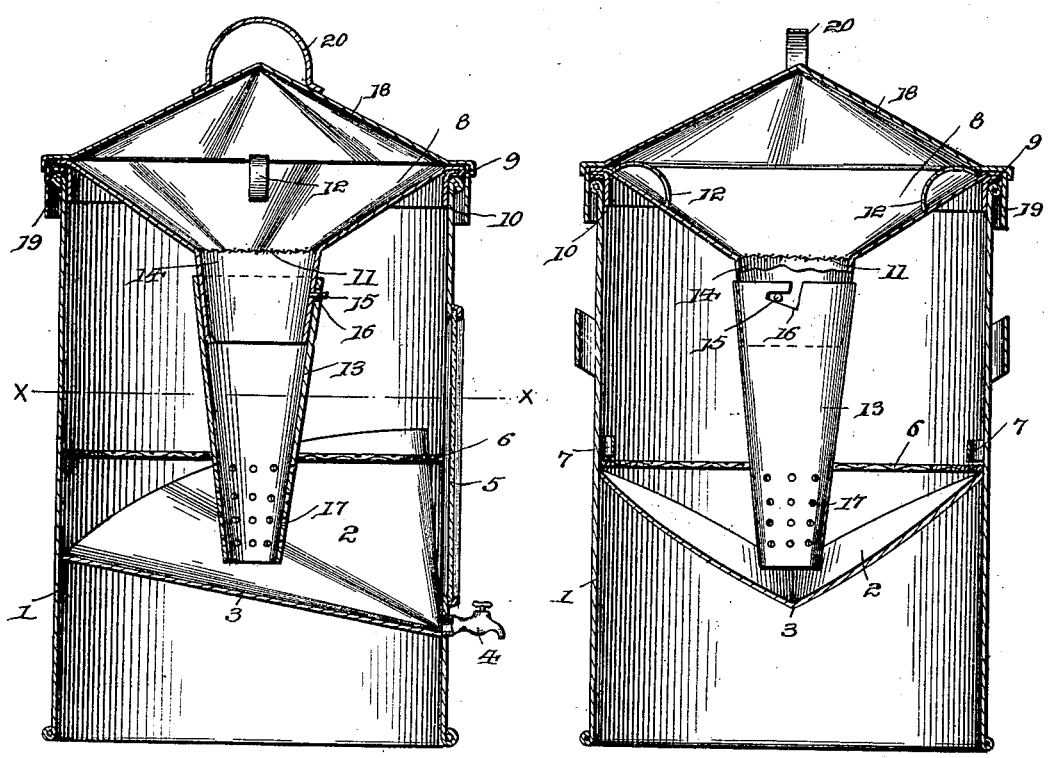
Figure 3:
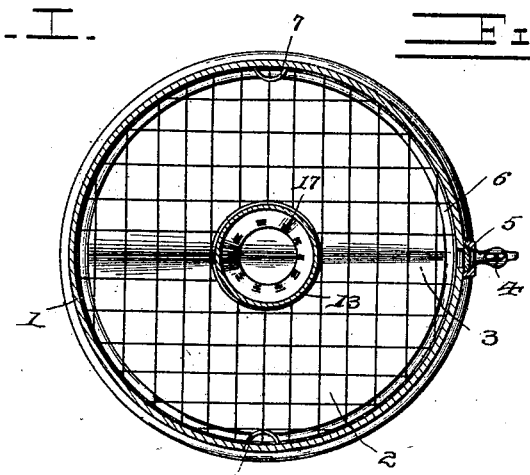

In the drawings, Figure 1 is a vertical central sectional view of a cream-separator constructed in accordance with the present invention. Fig. 2 is a similar view taken at right angles to Fig. 1. Fig. 3 is a transverse horizontal sectional view taken on the line $x$ $x$ of Fig. 1.

Corresponding parts in the several figures of the drawings are designated by like characters of reference.

Referring to the drawings, 1 designates a pan or receptacle forming the body of the separator, which is open at its upper end and is provided with a substantially V-shaped bottom 2, which is disposed above the lower edge of the sides of the receptacle. The vertex of the angle between the oppositely-inclined sides of the bottom forms a gutter 3, which inclines downwardly, and at the lowermost end of this gutter there is provided a suitable faucet 4, carried by the side of the receptacle and communicating with the interior thereof, so as to draw off the milk, which is delivered by the gutter. Located immediately above the faucet 4 and extending longitudinally of the receptacle is a transparent or glass-covered opening 5, so that the interior of the receptacle may be conveniently viewed for the purpose of discerning when the cream has become separated from the milk.

It will be understood that the opposite sides of the bottom 2 provide opposite interior flanges, upon which is seated a perforate or foraminous rack or baffle-plate 6, and located at opposite sides of the interior of the receptacle are suitable diametrically-opposite stop shoulders or lugs 7, which engage over the opposite edges of the baffle-plate, at the points where the latter rests upon the edges of the inclined bottom, for the purpose of holding the baffle-plate in place. By reason of the downwardly-inclined edges of the opposite sides of the V-shaped bottom of the receptacle, as best shown in Fig. 1 of the drawings, it will be apparent that the rack or plate 6 may be tilted or inclined upon its axis, which is on a line drawn through the diametrically-opposite points of contact with the edges of the bottom, so as to insert the plate beneath the opposite lugs or shoulders 7, and by a reverse movement may be readily removed from engagement with the shoulders or lugs, so that the rack or plate is detachably held in place and may be readily removed for cleansing or for any other desired purpose.

Fitted to the upper open end of the receptacle is a funnel 8, having an outwardly-directed annular flange 9, resting upon the upper edge of the receptacle, and a pendent annular band 10, snugly fitting the interior of the receptacle, so as to prevent accidental lateral displacement of the funnel. The central opening of the funnel is provided with a screen or strainer 11, and suitable diametrically-opposite handles 12 are provided upon the inner side of the bowl of the funnel and near the upper edge thereof, so as to facilitate the application and removal of the funnel. A detachable spout 13 is fitted to the short fixed spout 14 of the funnel, and the latter is provided with an outwardly-projecting pin or lug 15 for engagement with a substantially L-shaped or bayonet slot 16, formed in the upper end of the detachable spout, so as to provide a detachable connection between the two spouts. At the lower end of the detachable spout there is provided a plurality of perforations 17.

To protect the contents of the receptacle against ingress of foreign matter there is provided a conical cover 18, fitting upon the upper edge of the bowl of the funnel and having a pendent peripheral flange 19 embracing the upper end of the funnel and the receptacle, so as to prevent accidental lateral displacement of the funnel, and is furthermore provided with a handle 20 for applying and removing the said cover.

In the operation of the device the milk is poured directly into the receptacle or through the funnel 8, and afterward water of a lower temperature than the milk is poured into the funnel and discharged at the lower end thereof beneath the rack or baffle-plate 6, through which the detachable spout 13 passes and attacks the milk at the lower portion thereof. Thus it will be seen that the water does not pass downwardly through the volume of milk, and thereby the latter is not agitated by the introduction of water. It will now be apparent that the rack or perforate baffle-plate 6 retards the rising movement of both the milk and the water, so as to prevent violent agitation thereof and also to break up any currents which may be formed by the movement of the water. After the water has been introduced into the receptacle the device is permitted to stand for a suitable time until the cream has become separated and collected upon the upper surface of the milk, which may be readily discerned through the transparent opening 5. When the separation has taken place, the faucet 4 is opened, so as to draw off the water and milk, which operation is facilitated by the gutter 3 and the general inclination of the bottom of the receptacle, thereby leaving the cream within the receptacle, so that it may be eventually drawn off entirely separate from the water and milk.

In some instances it may be desirable to employ ice as the cooling agent, and in this event the rack 6 is removed and ice placed upon the bottom of the receptacle, after which the rack is replaced, so as to hold the ice upon the bottom of the receptacle and to prevent it from floating upon the milk, as it is important that the cooling agent be applied to the lower portion of the milk. Furthermore, it may not be always convenient or desirable to apply water or ice to the interior of the receptacle and in contact with the milk, and to provide for such a contingency the bottom of the receptacle is located above the lower edge thereof, so that the receptacle may be placed upon a suitable refrigerating device and receive the cold air therefrom within the walls of the lower end of the receptacle, and thereby retain said cold air in contact with the exterior of the bottom of the receptacle, thereby applying the cooling agent to the lower portion of the milk and without contacting therewith.

Having thus described the invention, what is claimed, and desired to be secured by Letters Patent, is—

1. A cream-separator, comprising a receptacle, a baffle-plate located within the interior of the receptacle, and intermediate of the top and bottom thereof, and means for discharging a liquid into the interior of the receptacle and below the baffle-plate.

2. A cream-separator, comprising a receptacle, a substantially-horizontal baffle-plate located within the interior of the receptacle and adjacent to the bottom thereof, and also provided with a central opening, and a funnel supported upon the upper edge of the receptacle, and having its spout extending through the central opening in the baffle-plate and discharging below the latter.

3. A cream-separator, comprising a receptacle, a substantially-horizontal baffle-plate located within the interior of the receptacle and adjacent to the lower end thereof, and an inlet-tube extending downwardly through the baffle-plate, and having its discharge end located below said baffle-plate.

4. A cream-separator, comprising a substantially-cylindrical receptacle, having a substantially V-shaped bottom, the vertex between the oppositely-inclined sides thereof forming a gutter, which is inclined transversely of the receptacle, and the upper edge of the device also being inclined, a substantially-horizontal baffle-plate removably resting upon intermediate portions of the opposite inclined edges of the bottom, and diametrically-opposite lugs provided upon the interior of the receptacle, located immediately above the respective points of contact between the edges of the bottom and the baffle-plate, said points of contact forming a pivotal support for the baffle-plate, and a faucet located at the lowermost end of the gutter.

In testimony that I claim the foregoing as my own I have hereto affixed my signature in the presence of two witnesses.

HENRY WHITLOCK.

Witnesses:
JOHN W. HOUSE,
R. W. COULTER.